Figure 5:
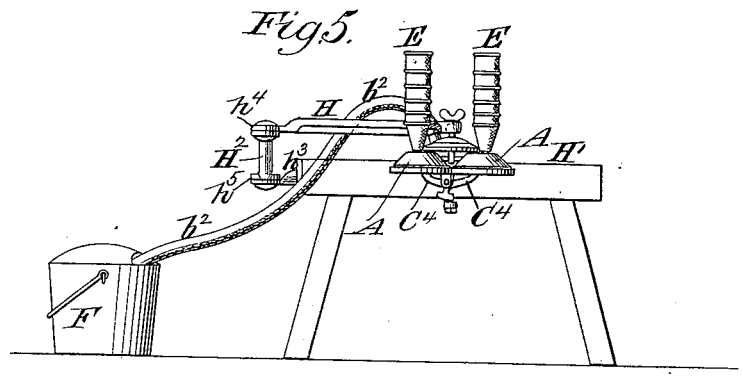

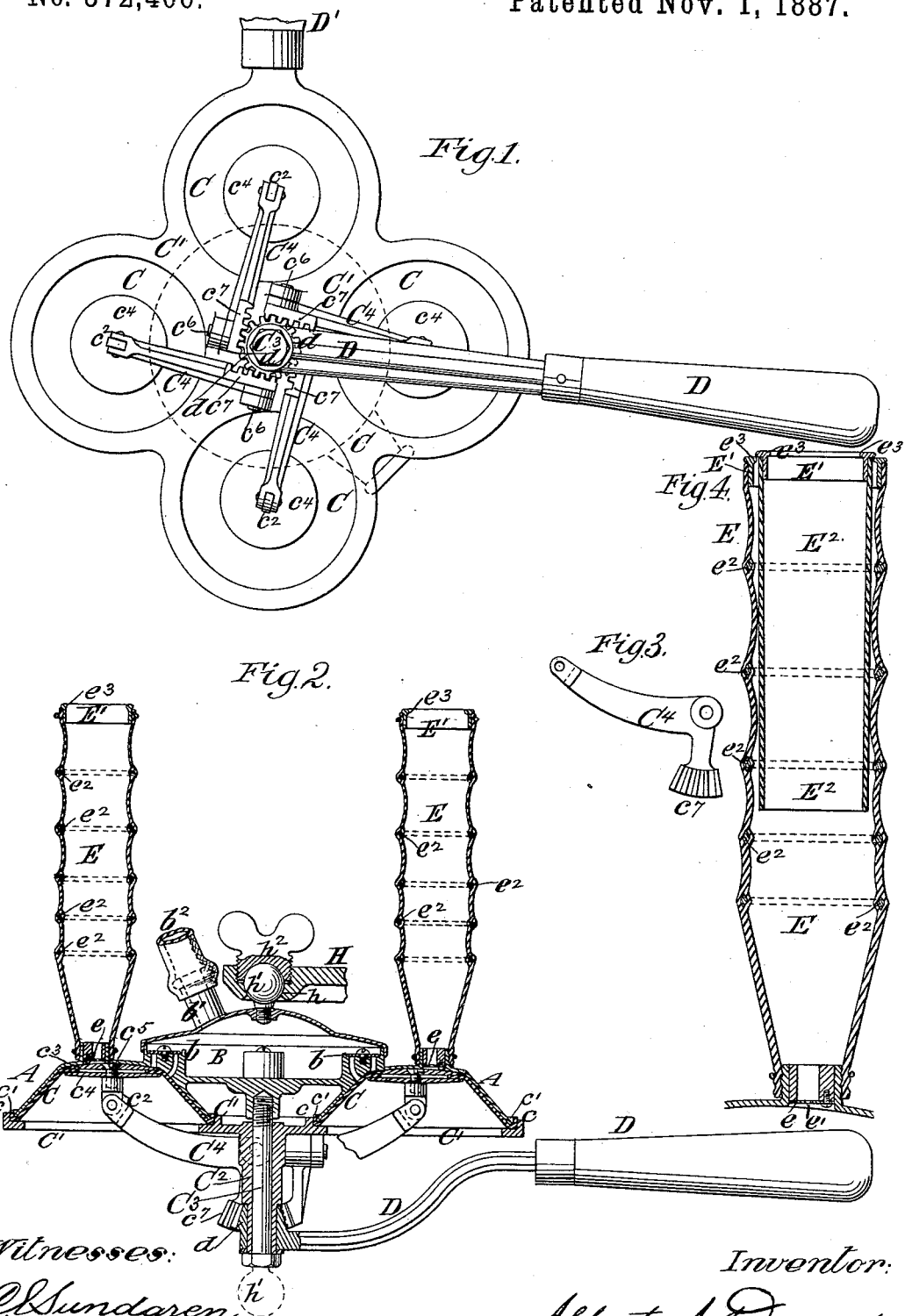

(No Model.) 2 Sheets—Sheet 2.

A. A. DURAND.
COW MILKER.

No. 372,406. Patented Nov. 1, 1887.

Witnesses:
C. E. Sundgren
Emil Herter

Inventor:
Albert A. Durand
by his attys
Brown & Hall

UNITED STATES PATENT OFFICE.

ALBERT A. DURAND, OF NEW YORK, N. Y.

COW-MILKER.

SPECIFICATION forming part of Letters Patent No. 372,406, dated November 1, 1887.

Application filed January 17, 1887. Serial No. 224,576. (No model.)

*To all whom it may concern:*

Be it known that I, ALBERT A. DURAND, of the city and county of New York, in the State of New York, have invented a new and useful Improvement in Cow-Milkers, of which the following is a specification.

My invention relates to cow-milkers of the class shown and described in my Letters Patent No. 216,838, dated June 24, 1879, and No. 335,182, dated February 2, 1886. The cow-milkers of that class consist, essentially, of a number of pump-chambers, 4, arranged in the same plane, and each provided with a teat socket or cup for receiving a teat of the cow, and with a flexible diaphragm which is operated to alternately draw milk from the teat and discharge it into a discharge or outlet chamber, from which it flows to the pail.

One feature of my present invention consists in a novel combination of parts, whereby through very simple mechanism the pump's diaphragms are operated by a direct push and pull, as distinguished from a canting movement. This mechanism consists in its essential elements of a movable handle or lever for operating a pinion and elbow-levers, each of which has its one arm connected with a diaphragm and its other arm formed with a gear-sector engaging the pinion.

The invention also consists in the combination, with a substantially cylindric teat cup or socket for a cow-milker, having a flexible wall and re-enforcing rings arranged at intervals in its length, whereby the portions of the wall between the rings are caused to exert a lateral pressure upon the teat, of an inner cup, also of flexible material, open at the bottom and removably fitted in the cup or socket, the lateral pressure produced by the collapsing of the cup or socket between the rings being transmitted through the inner flexible cup upon the teat.

The invention also consists in a teat cup or socket for a cow-milker, having a flexible wall and a re-enforcing ring of rigid material secured at the top of the cup or socket and provided with an internal bead or flange for fitting snugly around the base of the teat.

The invention also consists in the combination, with a teat cup or socket having a flexible wall and a direct outlet at its lower end, of an inner flexible cup open at the lower end and supported by resting at its upper end upon the teat cup or socket, whereby provision is afforded for ready removal of the inner cup from the cup or socket by simply withdrawing it upward therefrom.

The invention also consists in a teat cup or socket having a flexible wall and re-enforcing rings at intervals in its length, the top ring having an internal bead or flange, and having combined with it an inner flexible cup, also provided at the top with an internally-flanged ring.

The invention also consists in the combination, in a cow-milker, with a number of pump cups or chambers and their diaphragms and teat-sockets, of a centrally-located discharge-chamber and an outlet-pipe leading upward from the discharge-chamber to a point above the lower ends of the teat-sockets, and serving to maintain in the milker a quantity of milk sufficient to fill the space in the teat-sockets below the teats.

The invention also consists in the combination, with a cow-milker and a milking-stool, of supporting-arms extending from the stool and provided with a universal joint for connection with the milker and with the flat joint or joints providing for horizontal adjustment.

Figure 6:
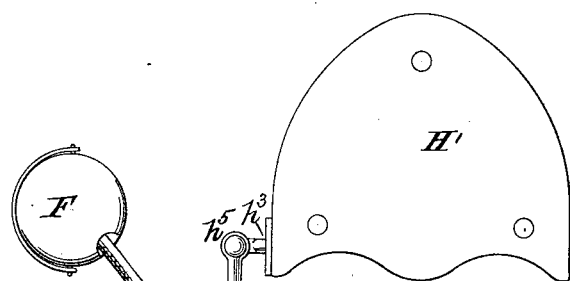
Figure 7:
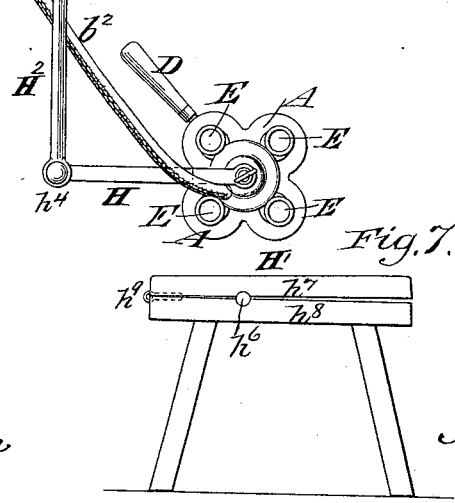

In the accompanying drawings, Figure 1 is an inverted plan of a milker embodying my invention, the fixed handle thereof being broken away to economize space. Fig. 2 is a vertical section of the milker. Fig. 3 represents one of the elbow-levers whereby the diaphragms are operated. Fig. 4 is a sectional view, upon a larger scale, of a teat-socket having an inner flexible lining and embodying my invention. Fig. 5 represents an elevation of the milker as supported from a stool. Fig. 6 is a plan of such parts; and Fig. 7 is a side view of a stool having its seat divided and having the wrist which supports the milker clamped between two portions of the seat, so as to be held securely in place when a person sits upon the stool.

Similar letters of reference designate corresponding parts in all the figures.

Referring first to Figs. 1 and 2, A designates pump chambers or cups, four of which are arranged about a central discharge-chamber, B, and the several pump chambers or cups are so connected with the discharge-chamber as to form a practically integral structure. Each pump-chamber A is fitted with a diaphragm, C, and I have shown a frame, C', as applied to the lower side of the pump structure and clamping between it and the pump structure the edges of the several diaphragms. The frame C' has upon its upper side flanges or ribs $c$, which conform to the shape of the pump chambers or cups, and the flanged edges $c'$ of the diaphragms are clamped and held by the ribs or flanges $c$ upon the edges of the pump-chambers A. The frame C' has a hub or sleeve, $C^2$, extending downward from its center, and is secured in place by a bolt, $C^3$, passing through the sleeve or hub and tapped into the pump structure.

Each diaphragm C has connected with it a central post or projection, $c^2$, and in this example of my invention two plates, $c^3$ $c^4$, are employed, and the inner edge of each diaphragm is clamped and held between these two plates by a screw, $c^5$, threaded into the post $c^2$.

For operating the diaphragms C, I employ a corresponding number of elbow-levers, $C^4$, which are pivoted at $c^6$ to a squared portion of the hub or sleeve $C^2$. Each of these elbow-levers $C^4$ has one arm connected with the post $c^2$ of the diaphragm and has upon its other and downwardly-extending arm a toothed sector, $c^7$. One form of elbow-lever which may be employed is shown in Fig. 3. The sector-arms $c^7$ of these levers all engage with a pinion, $d$, which is formed upon or secured to a movable lever or handle, D, fulcrumed upon the exterior of the hub or sleeve $C^2$. The milker has a fixed handle, D', a portion only of which is shown in Fig. 1, and by moving the lever or handle D with a shear-like action relatively to the fixed handle D' the pinion $d$ will be turned and the elbow-levers $C^4$ will be swung in planes tangential to the pinion and caused to operate the diaphragms with a direct pull and push, as distinguished from a canting movement.

The several pump chambers or cups are each surmounted by a teat cup or socket, E, which communicate by a flap-valve, $e$, with the pump chamber or cup, and this valve $e$ may have in it a minute hole, $e'$, which eases the action of the pump upon it and increases the efficiency of the device. Through this hole $e'$ a minute quantity of milk will return into the teat cup or socket on the discharge-stroke of the diaphragm.

The several pump chambers or cups communicate by delivery-valves $b$ with the discharge-chamber B, and from this discharge-chamber leads a nipple or pipe, $b'$, with which a flexible hose, $b^2$, may be connected. It will be observed that this discharge nipple or pipe $b'$ leads upward from the discharge-chamber B, and hence the discharge-chamber B and the teat cups or sockets E will be maintained nearly full of milk, and the discharge will not drain the milk from the portion of the teat sockets below the teats. The hose $b^2$ may conduct the milk to a pail, F, (shown in Figs. 5 and 6.)

The teat sockets or cups E which I employ are of india-rubber and have flexible walls, and are re-enforced at intervals in their length by rings $e^2$, of metal or other rigid material, which prevent their entire collapse. The portions of the socket or cup between the rings $e^2$ will collapse on the suction-stroke of the pump and will produce a lateral pressure upon the teat, which supplements the sucking action of the pump upon the teat-orifice. Inasmuch as the collapsing of the lower portion of the teat socket or cup below the teat would not have any useful effect, I prefer to make such lower portions stronger, or with greater capacity to resist the collapse within the upper portion. This result may be accomplished either by arranging the re-enforcing rings $e^2$ at a greater distance apart in the upper portion of the teat-socket than in the lower portion or by making the walls of the socket thinner in the upper portion than in the lower portion. The teat-sockets shown in Fig. 2 have both these features, and either may be employed.

The teat socket or cup E has at the top a re-enforcing ring, E', inserted within it, and this ring has an internal bead or flange, $e^3$, which is adapted to make tight fit around the base of the cow's teat.

Where it is desired to adapt the milker for cows having small teats, an inner flexible lining, $E^2$, may be applied within the teat socket or cup, as shown in Fig. 4, so as to reduce the size thereof. This lining is open at the bottom, and has at the top a re-enforcing ring, E', similar to that before described, which is provided with an internal bead or flange, $e^3$, for fitting snugly around the base of the teat. This lining or inner cup is supported by simply resting at the upper end of the socket or cup E, and may be withdrawn directly upward therefrom. The inner cup or lining, $E^2$, when made of flexible material, combines with the teat cup or socket E in a manner different from an inner cup or lining made of rigid material. The teat cup or socket E is flexible and collapsible between its re-enforcing rings $e^2$, and when the inner cup or lining $E^2$ is in place within the same the lateral pressure is transmitted through the inner cup or lining upon the teat, while the lateral pressure produced by the collapsing of the teat cup or socket E between the rings $e^2$ would not be transmitted through an inner cup or lining of rigid material.

In order to provide for the canting or tilting of the milker in any direction to bring it in a proper plane approximate to the horizontal for application to the teats, I prefer to support it directly by an arm, with which it is connected by a ball-and-socket joint. In this example of my invention the arm H has formed within it a cavity, $h$, to receive a spherical projection, $h'$, on the milker, and the cavity is closed by a screw, $h^2$, having a hemispherical recess in its end. Consequently, when the screw $h^2$ is set up into place within its socket the ball $h'$ will be held within an approximately-spherical socket, and freedom for adjusting the milker in any direction relatively to the arm H will be afforded.

The milker may be supported from a stool, H', as shown in Figs. 5 and 6. The stool will have secured to its side a bracket, $h^3$, from which extends an arm, $H^2$, and this arm $H^2$ serves to directly support the arm H. In Figs. 5 and 6 I have represented the arms H $H^2$ as connected by a flat pivotal joint, $h^4$, and I have also shown the arm $H^2$ as connected with the bracket $h^3$ by a corresponding joint, $h^5$. These joints afford provision for adjusting the milker or swinging it horizontally. Instead of securing the arms which support the milker by a bracket, $h^3$, to the side of the stool, said arms may spring from a wrist, $h^6$, which is held between two boards or pieces, $h^7 h^8$, of which the top of the stool is composed, as shown in Fig. 7. These pieces may be hinged together at $h^9$, and when a person is seated upon the stool the wrist $h^6$ will be clamped, so as to prevent sudden turning, and yet so as to permit of its being turned when it is desired to adjust the milker by hand. The stool will not of course afford sufficient support to the milker when simply standing on the ground, as would a base or pedestal of sufficient weight to prevent the milker from tilting; but the stool is a necessary utensil in milking, and when a person sits thereon the milker will be afforded an ample and stable support.

The supporting arm H may have its joint connected with a ball, $h'$, upon the bottom of the milker, which is shown by dotted lines in Fig. 2.

What I claim as my invention, and desire to secure by Letters Patent, is—

1. In a cow-milker, the combination, with a number of pump chambers or cups and diaphragms, of a movable handle or lever for operating a pinion and elbow-levers, each of which has its one arm connected with a diaphragm and its other arm formed with a gear-sector engaging said pinion, substantially as herein described.

2. The combination, with the pump chambers or cups and diaphragms and a plate or frame securing the diaphragms in place and having the sleeve or hub $C^2$, of a lever or movable handle, D, pivoted on said sleeve or hub and constructed with the pinion $d$, and the elbow-levers $C^4$, each having its one arm connected with a diaphragm and its other arm provided with a sector, $c^7$, substantially as herein described.

3. The combination, with a substantially cylindric teat cup or socket for a cow-milker, having a flexible wall, and re-enforcing rings $e^2$, arranged at intervals in its length, whereby the portions of the wall between the rings are caused to exert a lateral pressure upon the teat, of an inner cup, also of flexible material, open at the bottom and removably fitted in the cup or socket, the lateral pressure produced by the collapsing of the cup or socket between the rings $e^2$ being transmitted through the inner flexible cup upon the teat, substantially as herein described.

4. A teat cup or socket for a cow-milker, having a flexible wall and a re-enforcing ring, E', of rigid material, secured at the top of the cup or socket, and provided with an internal bead or flange, $e^3$, for fitting snugly around the base of the teat, substantially as herein described.

5. The combination, with a teat cup or socket having a flexible wall and a direct outlet at its lower end, of the inner flexible cup open at the lower end and supported by resting at its upper end upon the teat cup or socket, whereby provision is afforded for ready removal of the inner cup from the cup or socket by simply withdrawing it upward therefrom, substantially as herein described.

6. A teat cup or socket having a flexible wall and re-enforcing rings at intervals in its length, the top ring having an internal bead or flange, and having combined with it an inner flexible cup, also provided at the top with an internally-flanged ring, substantially as herein described.

7. In a cow-milker, the combination, with a number of pump chambers or cups and their diaphragms and teat-sockets, of a centrally-located discharge-chamber and an outlet-pipe leading upward from the discharge-chamber to a point above the lower ends of the teat-sockets and serving to maintain in the milker a quantity of milk sufficient to fill the space in the teat-sockets below the teats, substantially as herein described.

8. The combination, with a cow-milker and a milking-stool, of supporting-arms extending from the stool and provided with a universal joint for connection with the milker and with a flat joint or joints providing for horizontal adjustment, substantially as herein described.

ALBERT A. DURAND.

Witnesses:
C. HALL,
FREDK. HAYNES.